No. 721,068. PATENTED FEB. 17, 1903.
W. F. M. McCARTY.
APPARATUS FOR DECOMPOSING WATER BY ELECTROLYSIS.
APPLICATION FILED APR. 22, 1902.
NO MODEL.
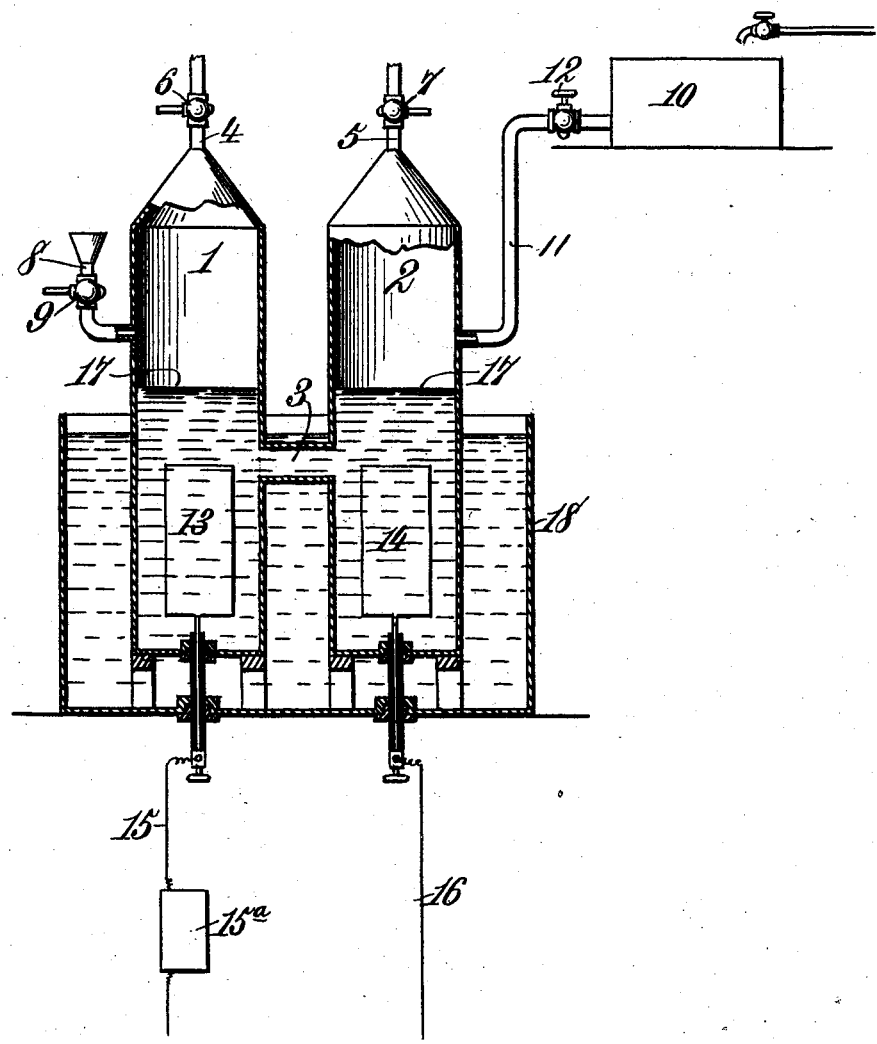
Witnesses.
Robert Everett,
Inventor.
William F. Mason McCarty,
By James L. Norris.
Atty.

UNITED STATES PATENT OFFICE.

WILLIAM F. MASON McCARTY, OF ROCKYRIDGE, MARYLAND, ASSIGNOR OF ONE-THIRD TO ARTHUR COPPELL, OF NEW YORK, N. Y.

APPARATUS FOR DECOMPOSING WATER BY ELECTROLYSIS.

SPECIFICATION forming part of Letters Patent No. 721,068, dated February 17, 1903.

Application filed April 22, 1902. Serial No. 104,171. (No model.)

*To all whom it may concern:*

Be it known that I, WILLIAM F. MASON MC-CARTY, a citizen of the United States, residing at Rockyridge, in the county of Frederick and State of Maryland, have invented new and useful Improvements in Apparatus for Use in Decomposing Water by Electrolysis, of which the following is a specification.

My invention relates to certain new and useful improvements in apparatus for use in decomposing water by electrolysis, and has for its object to provide a novel apparatus in the use of which the current will have to travel the minimum distance from one electrode to the other, but slight resistance will be offered to the current, a small electromotive force may be employed and effect a rapid decomposition of the water, and the gases, hydrogen, and oxygen as liberated will rise directly in separate receptacles.

To these ends the invention resides in the features of construction and the combination and arrangement of parts hereinafter described, and particularly pointed out in the claim.

In order that the invention may be clearly understood, I have illustrated the same in the accompanying drawing, in which the figure represents a sectional view of an apparatus constructed according to my invention.

Referring to the drawing, 1 2 indicate, respectively, two tanks, which are connected about centrally of their height by means of a conduit or pipe 3, affording communication between the two tanks. Each of the two tanks has an outlet 4 5, respectively, at its top, controlled by valves 6 7, which outlets are for the escape of the gases liberated by the decomposition of the water.

8 indicates an inlet controlled by a valve 9 for supplying sulfuric acid to the water in the tanks 1 2.

10 is a water-supply tank communicating by means of a pipe 11 with one of the tanks. A valve 12 is arranged in said pipe for controlling the supply of water to the tanks. Suitably supported in each tank 1 2 is an electrode 13 14, respectively, of platinum, 13 being the anode and 14 the cathode. The two electrodes 13 14 are connected by means of wires 15 16 with a source of electrical supply, (not shown,) and preferably I introduce a Ruhmkorff coil $15^a$ in the circuit to intermit the current, and thus facilitate the disengagement of the bubbles of gas from the electrodes. The electrodes are so located that their upper ends occupy a plane about coincident with the axis of the conduit 3, and it will be understood that the current passes through the water from one electrode to the other by way of the conduit 3. The water in the tanks 1 2 must be maintained at about the height indicated by the line 17 17. As the decomposition of the water occurs with great rapidity, a high degree of heat is generated, and to offset this the apparatus is immersed to about the height shown in a tank 18, filled with water.

The present apparatus is designed particularly for use in carrying out the process described in a companion application filed of even date herewith. According to said process tartrate of soda, tartrate of potash, and sulfuric acid are supplied to the water in the tanks 1 2 to increase its electrolytic power, or, in other words, render it more susceptible to the action of the electric current, so that rapid decomposition of the water occurs. The tanks being supplied with water, tartrate of soda and tartrate of potash are added thereto in the proportions of one pound of each to each two thousand pounds of water in the tank 10 and allowed to dissolve. Sulfuric acid is then added to the water through the opening 8, causing a violent ebullition thereof, and the current is turned on through the wires 15 and 16 to the electrodes 13 and 14. The passage of the current from anode 13 to cathode 14 by way of the conduit 3 rapidly decomposes the water, the oxygen and hydrogen passing through the conduit 3, as they are attracted by their respective poles. As these gases are attracted to and liberated from the respective electrodes they may rise directly to the tops of the tanks 1 2, oxygen rising in the tank 1 and hydrogen in the tank 2, as will be understood. From the outlets 4 5 these gases may be led to suitable holders. The liberation of the gases from the electrodes will be greatly facilitated by the use of a vibratory current of electricity.

It will be seen that the current may pass directly from the electrode 13 to the electrode 14 through the conduit 3, that it will have only a small distance to traverse, and that, therefore, the minimum amount of resistance will be offered. As a result I am enabled to use a current of very low electromotive force, with consequent economy in operation. It will also be seen that the apparatus is exceedingly simple in construction.

Having thus fully described my invention, what I claim as new is—

An apparatus for use in decomposing water by electrolysis, comprising two upright tanks connected about centrally of their height by a horizontal conduit and having outlets at their upper ends, an electrode suitably supported in each of said tanks, said electrodes having their upper ends located between the upper and lower edge of said conduit, a closable inlet 8 located in one of said tanks above the normal water-level therein, a water-supply pipe communicating with one of said tanks, and a water-jacket surrounding said tanks.

In testimony whereof I have hereunto set my hand in presence of two subscribing witnesses.

WILLIAM F. MASON McCARTY.

Witnesses:
 BRUCE S. ELLIOTT,
 GEO. W. REA.